United States Patent [19]
Briet

[11] Patent Number: 5,106,127
[45] Date of Patent: Apr. 21, 1992

[54] RAPID CONNECTION FLUID COUPLING

[75] Inventor: Gilles Briet, Gueugnon, France

[73] Assignee: Hutchinson, Paris, France

[21] Appl. No.: 633,245

[22] Filed: Dec. 21, 1990

[30] Foreign Application Priority Data

Dec. 27, 1989 [FR] France .................. 89 17235

[51] Int. Cl.$^5$ .................................................. F16L 35/00
[52] U.S. Cl. ............................................. 285/4; 285/110;
285/351; 285/319; 285/921
[58] Field of Search ....................................... 285/3-4,
285/23, 39, 110, 379, 319, 921, 351; 403/225

[56] References Cited

U.S. PATENT DOCUMENTS

| | | | |
|---|---|---|---|
| 1,933,117 | 10/1933 | Markle | 285/3 |
| 2,460,981 | 2/1949 | Francisco, Jr. et al. | 403/225 X |
| 2,924,472 | 2/1960 | Bush | |
| 3,844,585 | 10/1974 | Sands et al. | |
| 4,022,496 | 5/1977 | Crissy et al. | 285/287 X |
| 4,749,214 | 6/1988 | Hoskins et al. | 285/4 |

FOREIGN PATENT DOCUMENTS

| | | |
|---|---|---|
| 1998339 | 7/1968 | Fed. Rep. of Germany . |
| 7324437 | 6/1973 | Fed. Rep. of Germany . |
| 2452858 | 5/1975 | Fed. Rep. of Germany . |
| 2453237 | 5/1976 | Fed. Rep. of Germany . |
| 1083451 | 9/1967 | United Kingdom . |
| 1116951 | 6/1968 | United Kingdom . |

Primary Examiner—Dave W. Arola
Attorney, Agent, or Firm—Bell, Seltzer, Park & Gibson

[57] ABSTRACT

A rapid connection fluid coupling is disclosed, for connecting a first end piece, to which a cooling liquid flow duct or pipe of a motor vehicle engine is fixed, to a second end piece of a testing circuit, heater unit or other vehicle element. The first end piece has a perforator for a closure positioned in the end piece prior to filling the engine with the cooling liquid. The closure comprises a seal with a membrane made from an elastomer material, such as rubber or other similar material, having the general form of a cup with a bottom having weaker zones for tearing the cup after perforation at its center. The zones are formed as a star with radiating arms whose ends are on a circle which defines an annular zone with the periphery. The free end of the lateral wall of the membrane is molded on a frame with an L shaped half cross section and has at least one and preferably two peripheral lips oriented from the end towards the bottom while diverging with respect to the lateral wall. When the two end pieces are interconnected, the second end piece drives the closure into engagement with the perforator to perforate the closure and allow fluid flow through the end pieces.

6 Claims, 3 Drawing Sheets

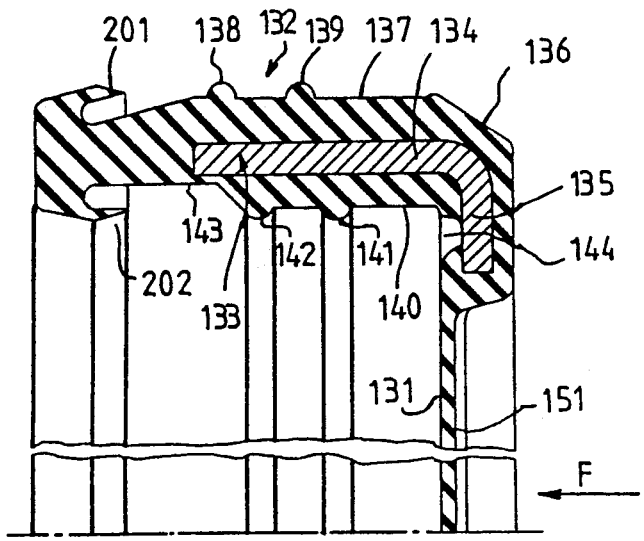
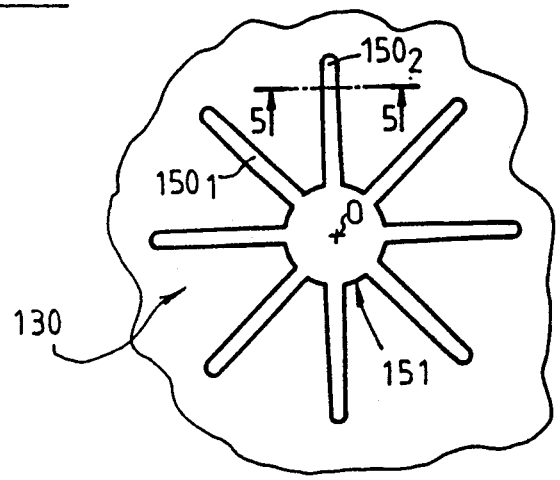
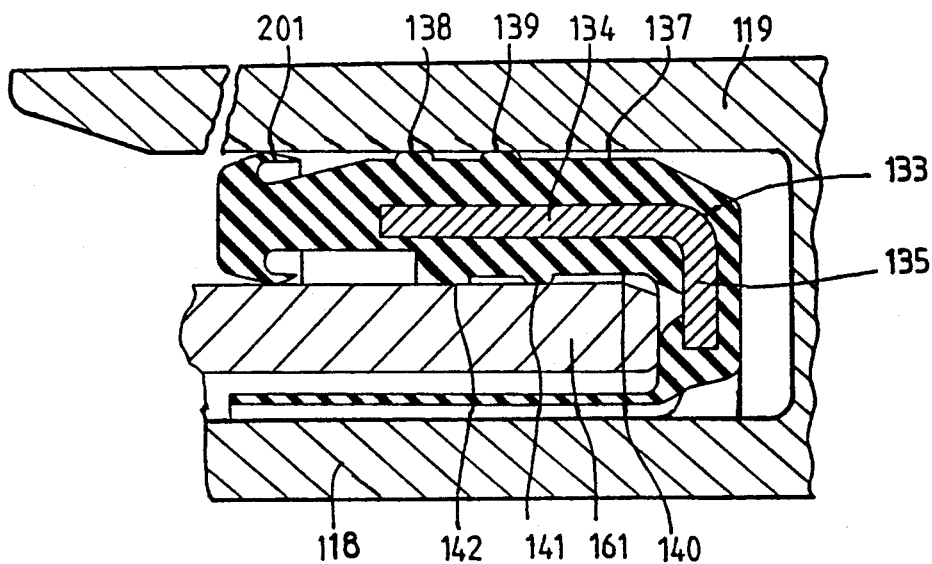

RAPID CONNECTION FLUID COUPLING

BACKGROUND OF THE INVENTION

The invention relates to a rapid connection fluid coupling especially for connecting a first end piece, to which a cooling liquid flow duct or pipe of a motor vehicle engine is fixed, to an end piece of a testing circuit, heater unit or other vehicle element and in which said first end piece has a perforator for perforating a closure adapted to be positioned in the end piece prior to filling the engine with cooling liquid.

A similar fluid coupling is described in the copending application Ser. No. 363,051 filed on 8th June, 1989 in the names of BRAUT and BRIET which also describes a closure adapted to fit into a coupling end piece. This closure comprises a seal with a membrane made from an elastomer material, such as rubber or other similar material, having the general form of a coup, with the bottom having weaker zones for tearing after perforation at its center. The tee zones are formed as a star with radiating arms whose ends are on a circle which defines an annular zone with the periphery.

Although the flow coupling described in the pending application gives satisfactory performance, it is apparent that its performances in operation could be improved, and it is, consequently, a general aim of the invention to make improvements to such a flow coupling.

SUMMARY OF THE INVENTION

In this respect, it is an aim of the invention to make improvements to the above flow coupling which considerably reduce the fitting force required with consequently an appreciable simplification of the other elements of the coupling.

It is also an aim of the invention to make improvements to the fluid coupling which further reduce the force required for removing the seal after a long period of use with consequently the possibility of easy dismantling, even after an extended period of service without dismantling.

It is a further aim of the invention to make improvements to the fluid coupling which increase the reliability thereof, particularly from the sealing point of view.

It is finally an aim of the invention to make improvements to the fluid coupling simplifying manufacture, particularly with respect to the manufacturing tolerances of the end pieces.

A rapid connection fluid coupling, especially for connecting a first end piece, to which a cooling liquid flow duct or pipe of a motor vehicle engine is fixed, to a second end piece of a testing circuit, heater unit or other vehicle element. The first end piece has a perforator for a closure adapted to be positioned in the cooling liquid and which comprises a seal with a membrane made from an elastomer material, such as rubber or the similar material, having the general form of a cup with a bottom having weaker zones for tearing same after perforation at its center. The zones are formed as a star with radiating arms whose ends are on a circle which defines an annular zone with the periphery and is characterized in that and the free end of the lateral wall of the membrane molded on a frame with an L shaped half cross section has at least one and preferably two peripheral lips oriented from the end towards the bottom while diverging with respect to the lateral wall.

According to another characteristic of the invention, the lateral wall of the membrane has annular beads which are illustrated in the drawings as longitudinal sealing ribs at least on its external face and preferably on its internal face also.

According to yet another characteristic of the invention, the ribs of the external face are offset longitudinally with respect to the ribs of the internal face.

In a modified embodiment, the ribs of the external and internal faces are not offset longitudinally.

In a preferred embodiment of the invention, the end of the lateral wall has two lips which are advantageously, but not necessarily, symmetrical with respect to the lateral wall, one of which, the external one, has a maximum diameter greater than the inner diameter of the portion against which it is intended to bear sealingly before the second end piece is fitted in the first one. The other lip, the inside one, has a maximum diameter less than the diameter of the portion of said second end piece against which it is intended to bear sealingly before fitting thereof on the second end piece.

BRIEF DESCRIPTION OF THE DRAWINGS

Other characteristics and advantages of the invention will be clear from the following description, given by way of example with reference to the accompanying drawings in which:

FIG. 3 is a partial view, in longitudinal section and on a larger scale, of a closure means for the coupling of the invention;

FIG. 4 is a view taken along arrow F of FIG. 3;

FIG. 5 is a larger scale cross section through line 5—5 of FIG. 4;

FIG. 6 is a partial view on a larger scale of the device after connection together of the end pieces.

DESCRIPTION OF THE PREFERRED EMBODIMENT

Figure 1:
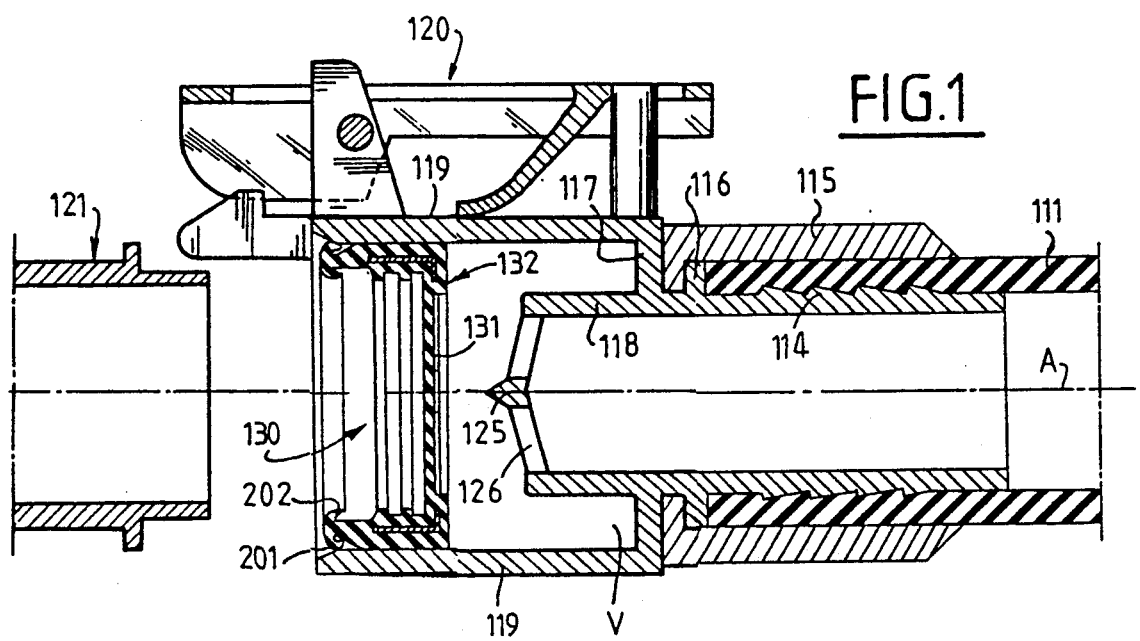
FIG. 1 is a schematic longitudinal sectional view illustrating a fluid coupling according to the invention in its condition prior to connection together of the end pieces.

A rapid connection fluid capacity according to the invention is illustrated. The coupling can be used on various apparatus, including the hose or flexible pipe 111 of the engine, not shown, which, prior to fitting, is tested on a bench comprising a cooling liquid circuit ending at one end in a pipe 112 which is one of the component parts of the fluid coupling according to the invention. The coupling comprises a cylindrical internal sleeve 114 with axis A on which is fitted the pipe 111 held in position by a ring 115. Sleeve 114, which has an external collar 116 for abutment of pipe 111, also has a second collar 117 of a larger diameter than the first one and which forms the bottom of a V space defined inwardly by a chimney 118 extending sleeve 114 and outwardly by an end piece 119 forming the female portion of the connection which has means 120, for example resilient lugs, for removable connection to the male portion 121 of the connection comprising pipe 112.

As in the coupling disclosed in the above copending application, the chimney 118 has at its end an axial perforator 125 held by radiating arms 126 and, similarly to what is described in the application, a closure 130 is associated with end piece 119 in the condition prior to connection for forming the circuit which is the position illustrated in FIG. 1.

As clearly shown in FIGS. 3, 4 and 5, the closure 130 is formed by a seal with a membrane made from an elastomer material, such as rubber or a similar material, in the form of a coup with a bottom 131 and a lateral wall 132 molded over a metal frame 133 whose half cross section is in the form of an L having a long axial arm 134 and a short radial arm 135. As is clear from FIG. 3, the face of the seal opposite the perforator 125 has a conical surface 136 at the junction between the bottom 131 properly speaking and the lateral wall whose free end is formed with two substantially symmetrical sealing lips 201 and 202, oriented longitudinally from the end of the lateral wall towards the bottom 131 and whose external surfaces diverge with respect to the direction of the axis of the membrane.

The lateral wall 132 further has longitudinal sealing ribs 138 and 139 on its external face 137 and, on its internal face 140, longitudinally sealing ribs 141 and 142 offset longitudinally with respect to the first ones.

On the internal face 140, the lateral surface is molded over frame 133 having gaps 143 and 144, the first ones on the free edge of the lateral wall and the second ones at the junction of said wall and said bottom 131. The gaps avoid deformation of the frame at the time of molding. The bottom or membrane 131 is provided, during manufacture, with zones which are weaker than the rest of the membrane because they are thinner (FIG. 5). The zones are intended to provide a smooth tear of the membrane disposed in a regular star pattern with center 0 merging with that of bottom 131 and having radiating arms $150_1$, $151_2$, $150_3$... etc. extending from a central circular zone 151, which is a smaller thickness, as far as the thicker portion molded over the radial short arm 135 of the metal frame.

In the condition shown in FIG. 1, which is that preceding fitting of the engine in a vehicle which it is intended to equip, the closure 130 is at a distance from perforator 125 and sealingly closes end piece 119 so that the engine filled with cooling liquid and pressurized for detecting possible leaks may be easily tested.

Figure 2:
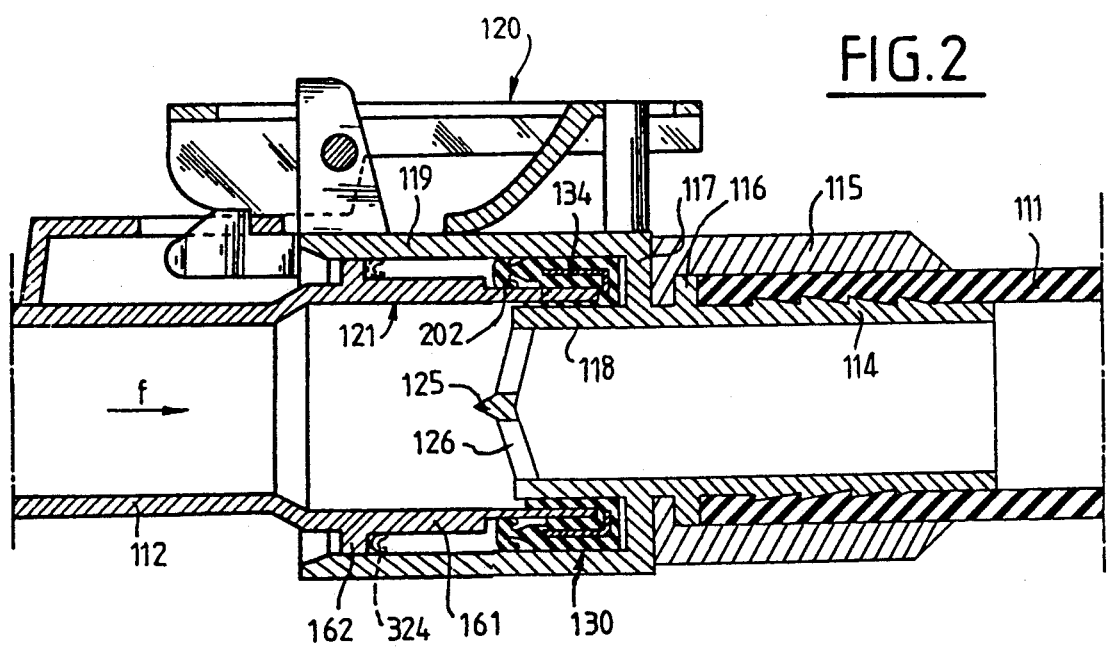
FIG. 2 is a view similar to that of FIG. 1 but in the connected condition.

When the engine is filled with its cooling liquid and assembled on the vehicle assembly line, the male portion 121 of the connection is moved in the direction of arrow f, FIG. 2, for cooperating with the female portion of the connection. During this movement, the end portion 161 of pipe 112 which has a radial collar 162 penetrates into the cup shaped closure 130 until the front end of its portion 161 abuts against the bottom portion 144 of the cup of the membrane. With continuing movement of the male portion 121 in the direction of arrow f, the portion drives the closure 130 closer to the perforator 125. When the perforator 125 comes into contact with the zone 151, it begins to tear the membrane 131. The initial tear then progresses along lines 150 while the membrane is applied against the external face of the chimney 118.

At the end of the movement drawing the male and female portions of the connection together, the means 120 are made operative, and the condition is then shown in FIG. 2, or on a larger scale in FIG. 6, where the membrane 131 of the closure means 130 is applied against the external surface of sleeve 118.

The device according to the invention, in which static sealing is obtained by means of lips 201, 202 and locking by means of ribs 138, 139 and 141, 142, of small dimensions, makes fitting possible without appreciable force.

Figure 7:
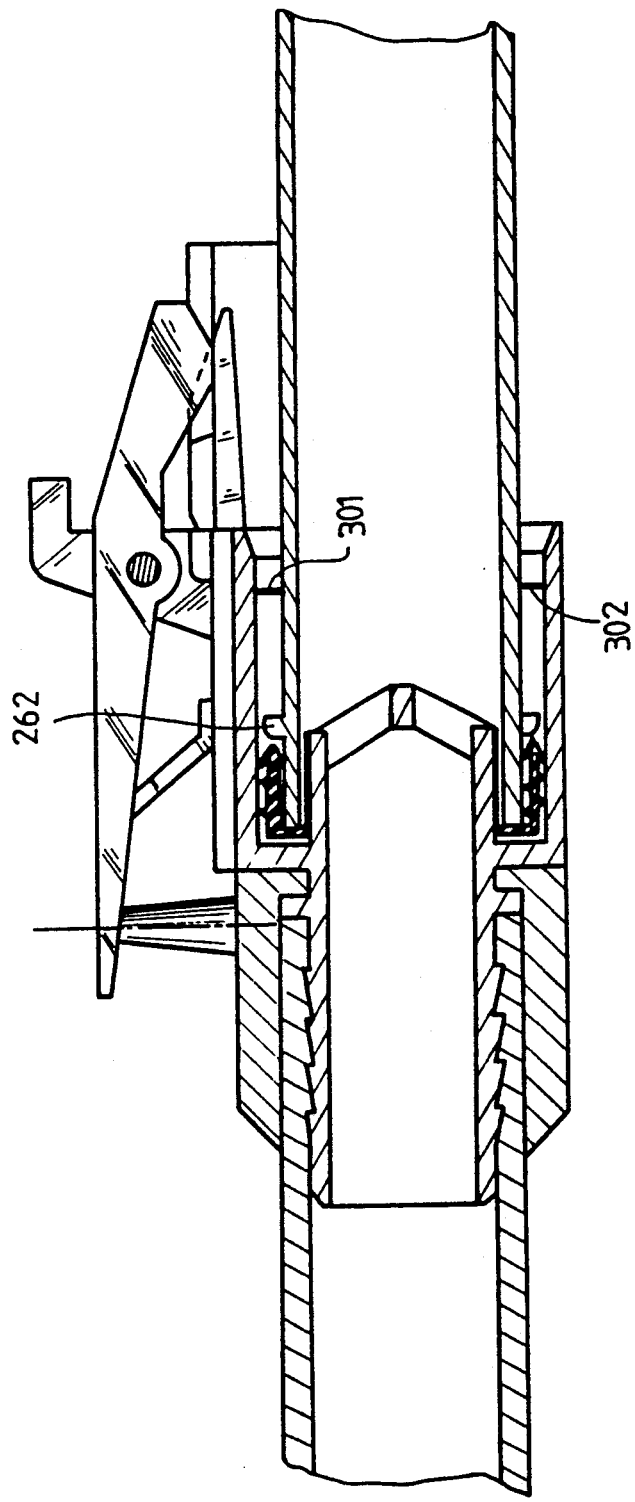
FIG. 7 is a view similar to FIG. 2 but for a modified end piece.

The connection illustrated in FIG. 7 only differs from that shown in FIG. 2 by the form of the male end piece which has resilient guide fins 301, 302, collar 262 then having a slightly reduced external diameter so as to avoid friction thereof against the female end piece.

The sealing provided by lips 201 and 202 makes the fitting of an additional seal superfluous, such as the 0 seal 24 of copending application Ser. No. 363,051.

If, however, redundancy of the sealing function is desired in certain environments, such a seal or a seal with additional lip may be fitted between the widened portions of the two end pieces, as shown with a broken line at 324 in FIG. 2.

What is claimed is:

1. A rapid connection fluid coupling comprising first and second end pieces, each end piece having a fluid passageway therein, said first and second end pieces being interconnectable so that a fluid passageway is defined therethrough, said first end piece being adapted for fitting to a duct such as in the cooling liquid circuit of a motor vehicle engine, a closure positioned within the fluid passageway of the first end piece for engaging and sealing between first and second end pieces when the end pieces are moved into interconnection, and wherein the closure is substantially cup shaped and includes a central bottom wall portion and a lateral wall, said lateral wall being molded onto an L-shaped reinforcement frame, the lateral wall including an end portion and a lip positioned on the end portion and diverging outward from the end of the lateral wall for engaging the end pieces to seal between the end pieces when connected, means supported by said first end piece and coaxially positioned within said fluid passageway of said first end piece for perforating said closure when said second end piece is moved into interconnection with said first end piece, means associated with the second end piece for engaging the closure and driving the closure into the perforator means for perforating the bottom wall portion of the closure when first and second end pieces are moved into interconnection, and means for holding together the first and second end pieces after the end pieces are coupled together.

2. The rapid connection fluid coupling according to claim 1 wherein the lateral wall includes two lips symmetrically oriented with respect to the lateral wall.

3. The rapid connection fluid coupling according to claim 1 wherein the lateral wall has molded circular beading to aid in sealing the closure within the fluid passageway of the first end piece.

4. A rapid connection fluid coupling comprising first and second end pieces, each end piece having a fluid passageway therein, said first and second end pieces being interconnectable so that a fluid passageway is defined therethrough, said first end piece being adapted for fitting to a duct such as in the cooling liquid circuit of a motor vehicle engine, a closure coaxially positioned within the fluid passageway of the first end piece for engaging and sealing first and second end pieces when the end pieces are moved into interconnection, and wherein the closure is substantially cup shaped and includes a central bottom wall portion and a lateral wall, said lateral wall being molded onto an L-shaped reinforcement frame, the lateral wall including an end portion and a lip positioned on the end portion and diverging outward from the end of the lateral wall for engaging the end pieces to seal between the end pieces when connected, and wherein the lateral wall includes inner and outer peripheral wall surfaces and a plurality of longitudinal sealing ribs positioned on the inner and outer peripheral surfaces, means supported by said first end piece and coaxially positioned within said fluid passageway of said first end piece for perforating said closure when said second end piece is moved into interconnection with said first end piece, means associated with the second end piece for engaging the closure and driving the closure into the perforator means for perforating the bottom wall portion of the closure when first and second end pieces are moved into interconnection, and means for holding together the first and second end pieces after the end pieces are coupled together.

5. A rapid connection fluid coupling according to claim 4 wherein the longitudinal sealing ribs positioned on the outer peripheral surface of the lateral wall are offset longitudinally relative to the longitudinal sealing ribs positioned on the inner peripheral surface of the lateral wall.

6. The rapid connection fluid coupling according to claim 4 wherein the longitudinal sealing ribs positioned on the outer peripheral surface of the lateral wall are longitudinally aligned relative to the longitudinal sealing ribs positioned on the inner peripheral surface of the lateral wall.

* * * * *

UNITED STATES PATENT AND TRADEMARK OFFICE
CERTIFICATE OF CORRECTION

PATENT NO. : 5,106,127

DATED : April 21, 1992

INVENTOR(S) : Gilles Briet

It is certified that error appears in the above-identified patent and that said Letters Patent is hereby corrected as shown below:

Column 1, line 14, "application" should be -- patent application --.

Column 1, line 19, "coup" should be -- cup --.

Column 1, line 58, "the" should be -- other --.

Column 1, line 64, delete "and".

Column 2, line 35, insert -- fluid -- before "coupling".

Column 2, line 47, "capacity" should be -- coupling --.

Column 3, line 7, "coup" should be -- cup --.

Column 6, line 3, "A" should be -- The --.

Signed and Sealed this

Third Day of November, 1992

Attest:

DOUGLAS B. COMER

Attesting Officer

Acting Commissioner of Patents and Trademarks